United States Patent [19]

Masnik et al.

[11] 3,921,448
[45] Nov. 25, 1975

[54] MASS FLOWMETER
[75] Inventors: Walter Masnik, Basking Ridge, N.J.; Gerald Bloom, Spring Valley, N.Y.
[73] Assignee: Flo-Tron, Inc., Patterson, N.J.
[22] Filed: Aug. 29, 1973
[21] Appl. No.: 392,664

[52] U.S. Cl. .................................. 73/205 D; 73/213
[51] Int. Cl.² ....................... G01F 1/34; G01F 1/44
[58] Field of Search ....... 73/194 M, 205 D, 211, 213

[56] References Cited
UNITED STATES PATENTS
| | | | |
|---|---|---|---|
| 3,102,423 | 9/1963 | Prindle | 73/205 |
| 3,116,639 | 1/1967 | Bird | 73/194 |
| 3,232,104 | 2/1966 | Fishman et al. | 73/205 |
| 3,266,309 | 8/1966 | Fishman et al. | 73/205 |

*Primary Examiner*—Herbert Goldstein
*Attorney, Agent, or Firm*—Edwin E. Greigg

[57] ABSTRACT

An extended range mass flowmeter comprising a connecting conduit functioning as a flow restrictor along its length for serially connecting inlet and outlet conduits. An essentially constant volume recirculating device connected to an intermediate point in said connecting conduit for recirculating a constant volumetric flow rate of fluid in said connecting conduit such that an additive and subtractive constant and equal component of volumetric flow rate of fluid is provided upstream and downstream of said intermediate point. A differential pressure measuring device connected between points located upstream and downstream of said intermediate point provides measurements linearly proportional to true mass flow.

10 Claims, 4 Drawing Figures

FOR Q>q FLOW IN CONDUIT 3 IS Q-q →
FOR Q<q FLOW IN CONDUIT 3 IS q-Q ←

FOR Q>q FLOW IN CONDUIT 4 IS Q-q →
FOR Q<q FLOW IN CONDUIT 4 IS q-Q ←

MASS FLOWMETER

This invention relates to apparatus adapted to measure rate of flow of fluids and more particularly relates to flowmeters adapted to measure mass flow rate in a linear manner.

In certain types of mass rate flowmeters employing flow restrictors, recirculation pumps or other devices are used to add and subtract a given volumetric flow of fluid to the flow under measurement. The meter is essentially a differential pressure type meter which measures the differential pressure across the flow restrictor or restrictors which pass the added and subtracted fluid. The subject invention is an improvement over existing flowmeters of this type.

In U.S. Pat. No. 3,232,104 issued Feb. 1, 1966, there is described a mass flowmeter comprising a pair of branch conduits connecting inlet and outlet conduits in which the flow is to be measured, said branch conduits each having a pair of orifices, and a constant volume recirculating pump connecting said two branch conduits at points intermediate the orifices therein.

According to an embodiment in said prior patent, all four orifices have the same flow characteristics, i.e., the products of discharge coefficient and cross sectional area of each orifice is the same. By proper placement of a measuring device the mass flow rate can be read as a linear function rather than as a non-linear function of the pressure differential as measured by said device. This arrangement has the further advantage that pulsating and irregular flows can be measured much more accurately than in the conventional differential pressure flowmeter. However, as mentioned, said device requires four orifices of the same flow characteristic.

According to the Pat. No. 3,232,105, issued Feb. 1, 1966, mass flow can be measured accurately by providing two matched pairs of flow restrictors in which each of the flow restrictors in a pair has the same flow characteristics as the other restrictor in that pair, but the restrictors in one pair do not have the same flow characteristics as the restrictors in the other pair. When measuring very viscous fluids or operating at low Reynolds numbers the flow coefficients of the orifices will change and effect the accuracy of the flowmeter. However, by preselecting the sizes, shapes and relationships of these matched pairs of orifices it is possible to obtain a mass flowmeter reading over a range of viscosities by so choosing the pairs so that the flow coefficients of one pair, comprising, for example, rounded edge orifices, will increase with a specified change in viscosity of the measured fluid at the same time that the flow coefficients of the other pair, comprising, for example, sharp edged orifices, will decrease.

In U.S. Pat. No. 3,662,599, issued May 16, 1972, it is described that for a measured flow rate greater than the recirculating flow rate, the differential pressure is measured across a specific two of said flow restrictors in order to obtain an indication which varies linearly with the mass flow rate of fluid passing through the flowmeter. If the measured flow rate should for some reason become less than the recirculating flow rate, then the differential pressure needs to be measured across a different two of said flow restrictors in order to obtain an indication which varies linearly with the mass flow rate of fluid passing through the flowmeter. If one were merely to change the connection of the differential pressure instrument to obtain linear readings over a range which varies from the measured flow rate being greater than, to less than the recirculating flow rate, difficulties are encountered. It should be noted that the mass flow rate changes direction in certain of the orifices for the two relationships, and that in aforementioned U.S. Pat. No. 3,662,599 the coefficients of the orifices were proper and matched for both directions of flow and the differential pressure instrument had its connections switchable across the proper orifices in order to permit linear measurements over the complete range.

It is an object of this invention to provide an improved extended range flowmeter which uses differential pressure transducer means to obtain a linear indication of mass flow rate of fluids.

It is another object of this invention to provide an improved, extended range flowmeter which uses a single, fixed connection differential pressure indicator or transducer for sensing differential pressure.

It is another object of this invention to provide an improved flowmeter which accurately measures transient or pulsating flow as well as steady flow over an extended range.

It is another object of this invention to provide an improved flowmeter which is inexpensive, simply constructed and requires a minimum of maintenance.

A further object of this invention is to provide an extended range mass flowmeter of the type comprising a connecting conduit of reduced cross section in which a constant volumetric flow rate of fluid is recirculated to provide an additive and subtractive component of volumetric flow to the measured volumetric flow in a manner enabling simplified measurement of mass flow rate of fluids.

A fuller understanding of the invention may be had by reference to the following description and claims taken in conjunction with the accompanying drawings in which:

Figure 1:
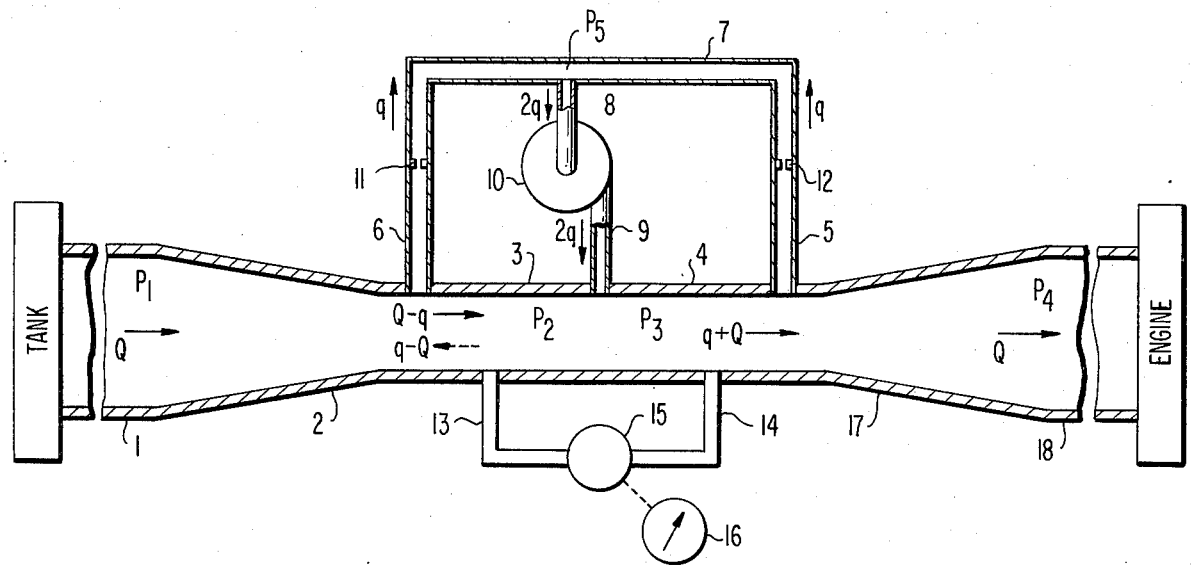
FIG. 1 is a schematic drawing of a flowmeter utilizing a reduced cross section conduit, a constant volume recirculating device and a differential pressure indicator or transducer. The flowmeter is a design which renders it useful for measuring flow which may be less than or greater than the volume recirculated by the recirculating pump.

Referring now to FIG. 1, 1 is an inlet conduit whose volumetric flow rate Q of fluid from a source such as a tank to a utilization means such as an engine, is to be measured by the flowmeter of this invention. Outlet conduit 18 has a volumetric flow rate identical to that in the conduit 1. A main conduit comprising branches or throats 3 and 4 connect inlet conduit 1 with said outlet conduit 18. Branch conduits 3 and 4 function as a flow restrictor along their entire length. Branch conduit 3 is reduced or restricted in size such that it is equivalent to a predetermined flow restrictor and branch conduit 4 is identical in size to branch conduit 3. A recirculation conduit 9 connects a constant volume recirculating device 10 to a point intermediate of branch conduits 3 and 4. Recirculation conduit 8 connects the recirculating device 10 to branch conduit 7 which in turn via branch conduits 6 and 5 connects witth the upstream and downstream sides of conduits 3 and 4 respectively.

The Recirculating Device 10 may be a positive displacement pump or blower or may be a centrifugal pump or blower or any constant recirculating device for recirculating a constant volumetric rate of fluid flow in the interconnecting or main conduit comprising branches 3 and 4 such that an additive and subtractive volumetric rate of fluid flow is provided in the main conduit.

Recirculating Device 10 recirculates fluid at a constant volumetric flow rate $2q$. This $2q$ flow splits in half with $q$ going into conduit 6 and another $q$ going into conduit 5. Restrictors 11 and 12 are balancing restrictors that insure that there occurs an equal flow $q$ in conduit 6 and in conduit 5. Flow restrictors 11 and 12 produce a relatively high pressure drop in branch conduits 6 and 5 as compared to conduit sections 3 and 4. This pressure drop minimizes the effect on the division of the recirculating volumetric flow rate due to unequal pressures developed upstream and downstream in the main conduit comprising branches 3 and 4.

Measured flow Q may be greater or less than recirculating flow $q$. In conduit 4 the recirculating flow $q$ and measured flow Q are always in the same direction and the flows are therefore additive. In conduit 3 when measured flow Q is less than the recirculating flow $q$, the direction of the flow is as shown by the dotted arrow in FIG. 1 and the flows are subtractive, that is, $q-Q$.

When measured flow Q is greater than the recirculating flow $q$, then the direction of flow in conduit 3 is shown by the solid arrow and the flow in the conduit is $Q-q$.

Conduits 3 and 4 are restrictors in that they have been sized to give a flow area equal to that of an equivalent orifice. Similar to an orifice, the conduits are intended to create a pressure drop. In the previous issued patents we have shown how the measured flow Q through a restrictor is modified by a recirculating flow $q$ such that the flow through one restrictor may be $q+Q$ and the flow through the other restrictor may be $Q-q$ or $q-Q$. The purpose is to create differing flows in the restrictors so that we can obtain different pressure drops across each restrictor. As has been shown in the previous patents the difference between these pressure drops is a differential pressure that is linear and proportional to true mass flow. Referring again to FIG. 1 differential pressure sensor 15 with indicating means 16 is used to measure this net differential pressure. The differential pressure sensor is connected to conduits 3 and 4 by means of conduits 13 and 14 on either side of where the flow rate $2q$ divides and before the divided flow rate $q$ in each branch 3 and 4 enters the branches 6 and 5. The pressure in conduit 3 is designated as P2 and the pressure in conduit 4 as P3. Since the flow in conduit 3 is always less than the flow in conduit 4, P2 will always have a higher pressure than P3. This is because the conduits are identical in flow area and the static pressure in a conduit increases with decreased flow rate. This applies for the situations where $q$ may be greater or less than measured Q. Thus it can be seen that a single differential pressure measuring device 15 can be used to measure the differential pressure for a flow range from where measured Q is greater than to where it is less than recirculating $q$. When measured Q is equal to zero flow then the pressure P2 is equal to P3 and we have a zero differential pressure output.

Figure 2:
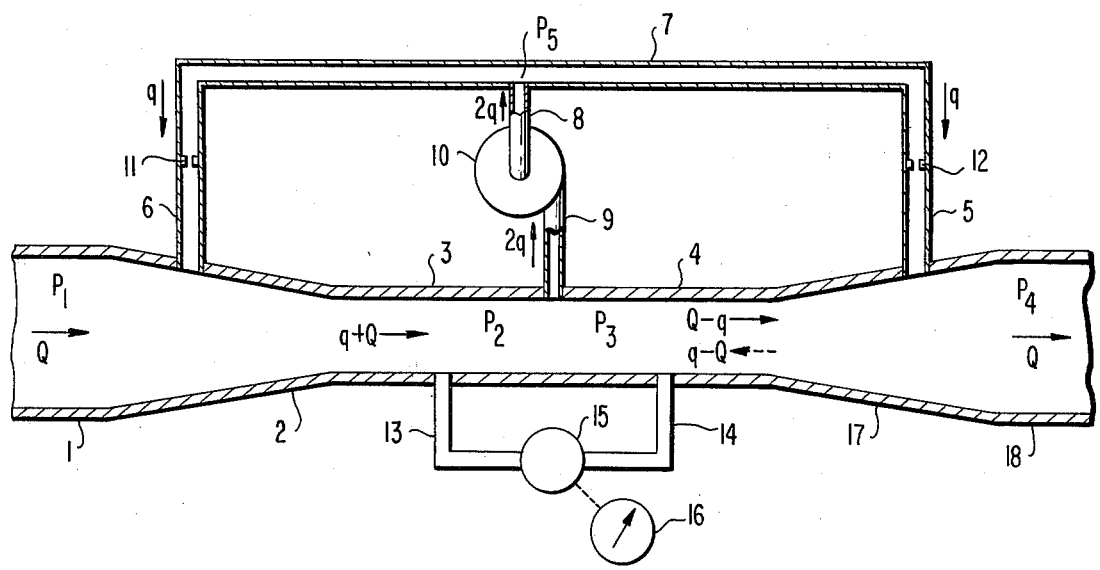
FIG. 2 illustrates another variation pertaining to the invention in which the direction of recirculating flow is reversed.

In FIG. 2 we show the recirculating flow may be in a direction opposite to that shown in FIG. 1. The same theory applies except that now P3 is always greater than P2. The measurement is made in the branch conduits between points where the recirculated volumetric flow rate is additive and subtractive with respect to the measured volumetric flow rate.

Figure 3:
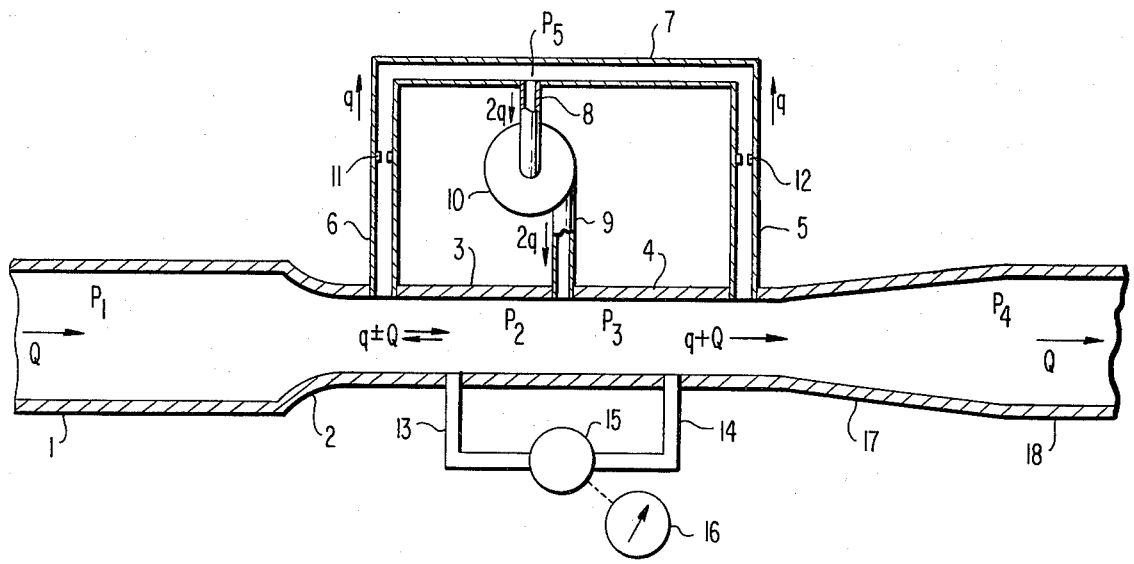
FIGS. 3 and 4 illustrate various transition conduit designs useful in practicing the present invention.
Figure 4:
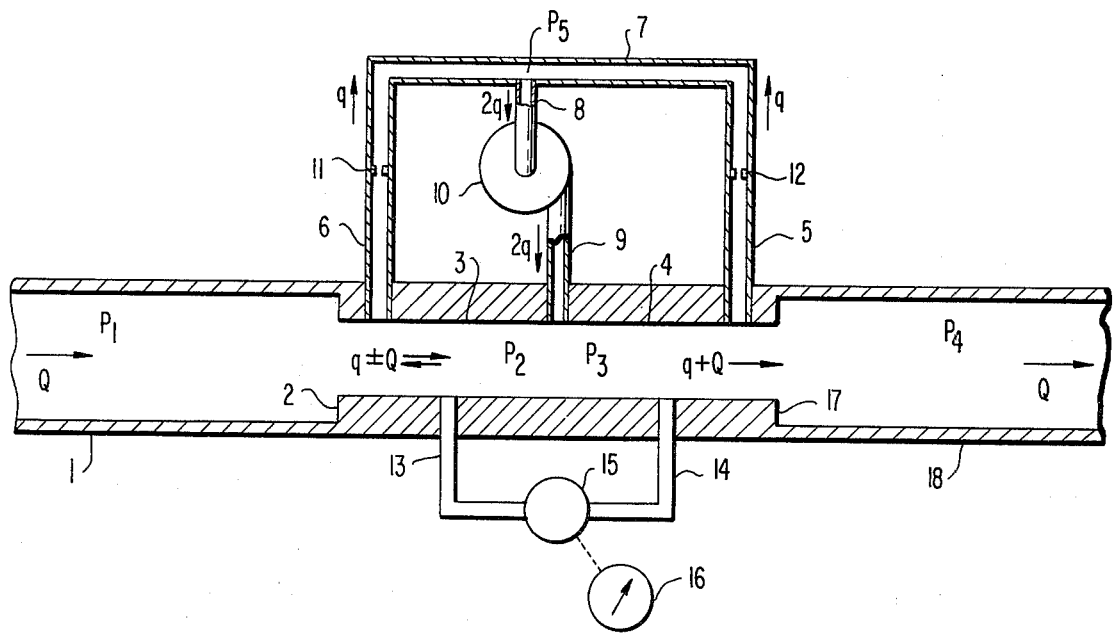

In both FIGS. 1 and 2 we show tapered or venturi shaped approach and discharge transition sections for conduits 3 and 4. This tapering of the inlet and discharge is intended to minimize overall pressure drop of fluid flow from the inlet conduit 1 to branch 3 and from branch 4 to the exit conduit 18. Other approach and discharge shapes and combinations of shapes may be utilized for this purpose. These are illustrated in FIG. 3. In FIG. 3 we have a rounded approach to conduit 3 and a tapered discharge from conduit 4. Where the flowmeter is limited in length the design of FIG. 4 may be utilized provided overall pressure loss between the inlet and outlet conduits is not a problem. Here the transitions are abrupt in going from inlet to branch to outlet or exit conduits. Under certain circumstances a combination of transition conduit sections and abrupt transitions may be employed. In FIG. 4 we have a sharp edge approach and discharge for conduits 3 and 4.

Also, conduits 6 and 5 can be located at points other than at conduit 3 and 4. They may be located at conduits 1 and 18 respectively or at points intermediate thereof such as in the transition conduit sections 2 and 17 as shown in FIG. 2.

In one embodiment of the invention the inlet and outlet conduits 1 and 18 were circular and had twice the diameter of the connecting conduit comprising branches 3 and 4. The reduction in diameter is dimensioned to cause the connecting conduit to function as a restrictor providing a pressure drop of sufficient magnitude to produce a measureable differential pressure signal. The relative dimensioning will vary depending on applications. The branch conduits in this embodiment were of the order of one half of the diameter of the connecting conduit and the restrictors 11 and 12 were of the orifice type and dimensioned to provide a relatively high pressure drop in sections 6 and 5 and as compared to sections 3 and 4 as previously explained. The pressure measuring device was connected to the same points in the connecting conduit and provided linear indications of mass flow rate of fluid from zero to maximum mass flow rate over the range from where Q is zero to where Q is less than or greater than $q$.

Although the invention has been described with a certain degree of particularity, it is understood that the disclosure has been made only by way of example and that numerous changes in the details of construction of the combination of arrangement and arrangement of parts may be resorted to without departing from the spirit and scope of the invention as hereinafter claimed.

What I claim as new and desire to secure by Letters Patent of the United States is:

1. An extended range mass flowmeter for measuring the mass flow rate of fluid flowing through a main conduit from an inlet to an outlet portion thereof comprising a connecting conduit for serially interconnecting said inlet and outlet conduit portions to pass a volumetric flow rate Q of fluid from said inlet to said outlet conduit portions, said connecting conduit comprising a throat having a reduced cross section relative to the cross sections of the inlet and outlet conduit portions dimensioned to act as a flow restrictor along a substantial portion of its length, means for recirculating a constant volumetric flow rate of fluid $2q$ to said throat to provide a constant and equal additive and subtractive component of volumetric flow rate $q$ of fluid in said throat to the volumetric flow rate of fluid Q in said throat, said recirculating means comprising a constant volumetric flow rate $2q$ recirculating device coupled between an intermediate point in said throat and through a respective further conduit to said connecting conduit at a point upstream and a point downstream of said intermediate point, flow restrictor means within said further conduit serving to insure that a volumetric flow rate of fluid $q$ through said further conduit is constant, and means for measuring the differential pressure in said connecting conduit between two points where the recirculating volumetric flow rate $q$ is additive and subtractive respectively with respect to the volumetric flow rate Q, said recirculating device providing one of said additive and subtractive rates of volumetric flow rate of fluid $q$ to the volumetric flow rate of fluid Q upstream of said intermediate point and the other of said additive and subtractive rates of volumetric flow rate of fluid $q$ downstream of said intermediate point.

2. An arrangement according to claim 1 comprising a transition conduit between at least one of said inlet and outlet conduits and said connecting conduit for minimizing the pressure drop across the flowmeter.

3. An arrangement according to claim 1 wherein said inlet, outlet and connecting conduits are of circular cross section, said means for measuring the differential pressure comprises a differential pressure sensor with means for indicating the sensed differential pressure, and said recirculating means comprises a constant volumetric pump.

4. An arrangement according to claim 1 wherein said two points are the same points over the range where the component of volumetric flow rate of fluid is greater than or less than the measured volumetric flow rate of fluid.

5. A mass flowmeter for interconnection between inlet and outlet conduits carrying a volumetric flow rate of fluid Q comprising a first main conduit for connection between said inlet and outlet conduits for transferring fluid at said volumetric flow rate Q from said inlet to said outlet conduit, said first main conduit having a uniform, reduced diameter equal to a predetermined orifice diameter restrictor, a second branch conduit having its ends connected to said first main conduit adjacent its inlet and outlet end connections respectively, first and second flow restrictors located at spaced points in said second branch conduit, a constant volume fluid recirculating device comprising an inlet and outlet conduit, one of said device conduits connected to said second branch conduit at a point intermediate said first and second flow restrictors and the other of said device conduits connected to said first main conduit at a point intermediate the second branch conduit connections to said first main conduit thereto for recirculating fluid therebetween at a constant volumetric flow rate $2q$, said first and second flow restrictors being dimensioned to insure an equal volumetric rate of fluid flow $q$ between each end of said second branch conduit and the device conduit coupled to said second branch conduit, and a single differential pressure sensor coupled between two spaced points in said first main conduit located on opposite sides of the connection of said device to said first main conduit where said recirculating volumetric flow rate is respectively additive and subtractive for measuring the differential pressure for a flow range from where the volumetric flow rate Q is greater than $q$ to where it is less than $q$.

6. An arrangement according to claim 5 further comprising conduit sections coupling said first main conduit to said inlet and outlet conduits respectively and having their cross sectional diameters shaped to minimize overall pressure drop from said inlet to said outlet conduits.

7. An arrangement according to claim 6 wherein said conduit sections comprise venturi shaped sections.

8. An arrangement according to claim 5 wherein said recirculating fluid is additive to the flow of fluid in one section of said first main conduit and subtractive in another section of said main conduit.

9. A mass flowmeter adapted to measure the mass flow rate of an effectively incompressible fluid passing therethrough from an inlet to an outlet conduit comprising first and second branch conduits and means for connecting said first and second conduits in a first series arrangement between said inlet and outlet conduits for transferring fluid at a volumetric flow rate Q from said inlet to said outlet conduit, said first and second branch conduits having uniform diameters of reduced size equal to a predetermined orifice diameter restrictor, third and fourth branch conduits and means for connecting said third and fourth conduits in a second series arrangement between a point in said first branch conduit near its remote end and a point in said second branch conduit near its remote end, a fluid recirculating device connected between tthe junction of said first and second conduits and the junction of said third and fourth conduits for recirculating fluid at a constant volumetric flow rate $2q$ between said first and second series arrangements, first and second flow restrictors located in said third and fourth branch conduits for equalizing the volumetric flow rate of fluid therein to $q$ respectively, and means coupled between said first and second branch conduits where the differential pressure varies linearly with changes in the mass flow rate of fluid flowing through said flowmeter for measuring the differential pressure.

10. A mass flowmeter for interconnection between inlet and outlet conduits carrying a volumetric flow rate of fluid Q comprising a first main conduit for connection between said inlet and outlet conduits for transferring fluid at said volumetric flow rate Q from said inlet to said outlet conduit, said first conduit having a reduced cross section relative to the cross section of said inlet and outlet conduits dimensioned to act as a predetermined, continuous orifice restrictor along a substantial portion of its length, a second branch conduit having its ends connected to said first main conduit adjacent its inlet and outlet end connections respectively, and flow restrictor means positioned between its ends serving to insure that the volumetric flow rate of fluid through the second branch conduit is constant, a constant volumetric flow rate $2q$ recirculating device connected to an intermediate point of the reduced cross section of the first main conduit and the second branch conduit between its ends for recirculating a first, additive, constant volumetric flow rate $q$ of fluid through a first section of said first main conduit located between the intermediate point in said first main conduit and its connection to said second branch conduit and a portion of the second branch conduit and a second, subtractive, constant volumetric flow rate $q$ of fluid through a second section of said first main conduit located between said intermediate point in said first main conduit and its connection to said second branch conduit and another portion of the second branch conduit, and means for sensing the differential pressure developed across said intermediate point in said first conduit for indicating the value of the measured mass flow rate.

* * * * *